F. KEES.
DISPENSING DEVICE.
APPLICATION FILED OCT. 2, 1915.
1,220,753.
Patented Mar. 27, 1917.
2 SHEETS—SHEET 2.
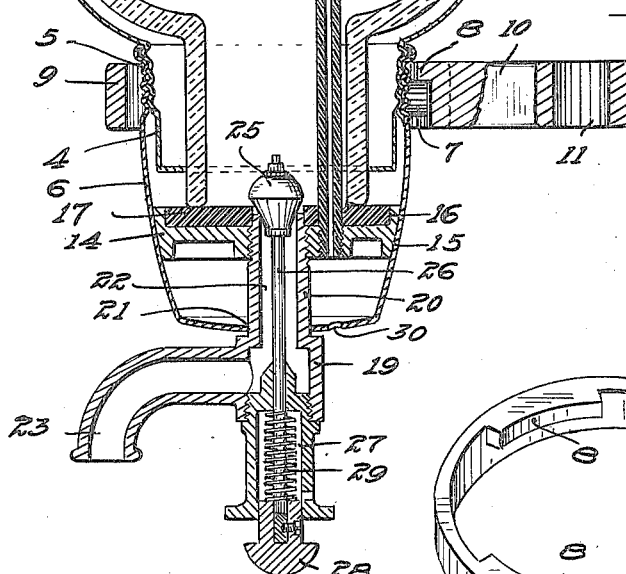
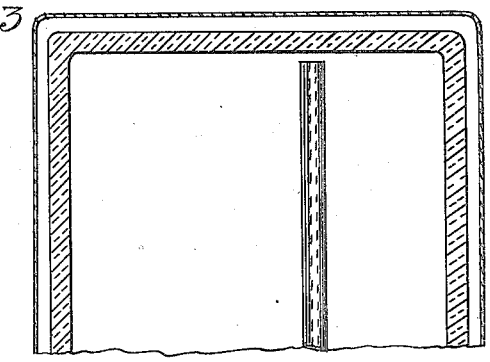
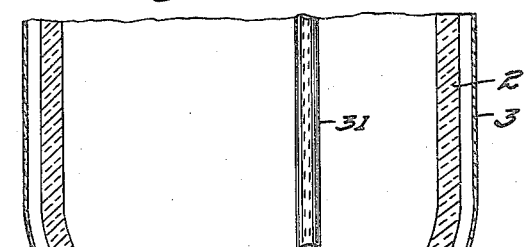
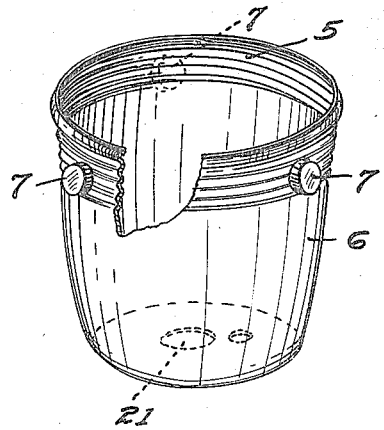
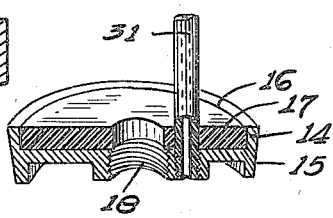
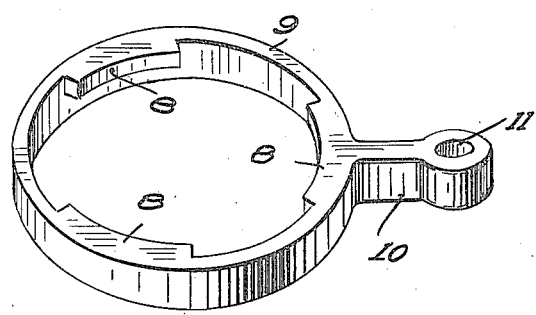
Witnesses
G. E. Sorensen
E. A. Paul
Inventor
FREDERICK KEES
BY Paul & Paul
ATTORNEYS

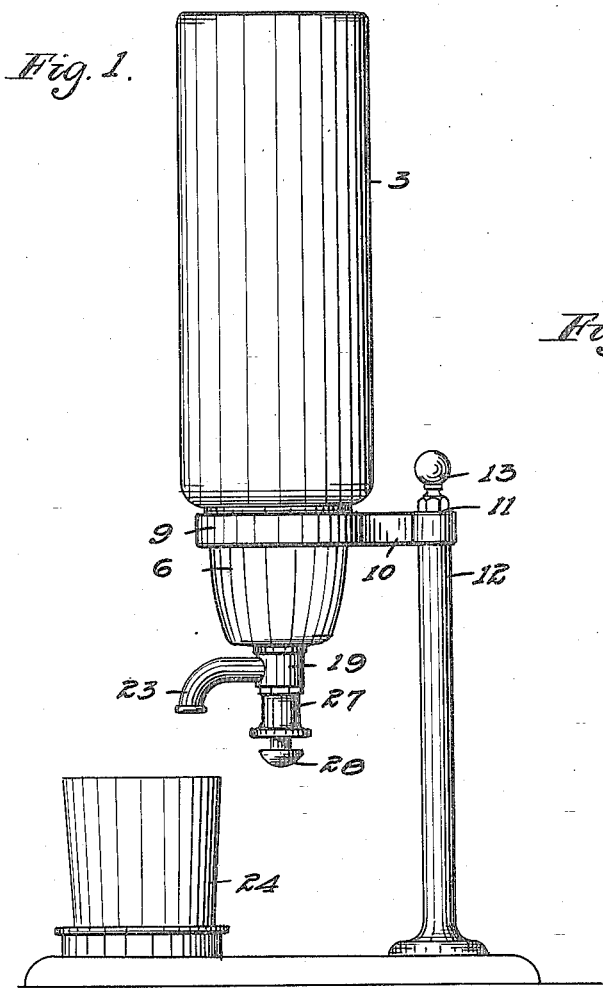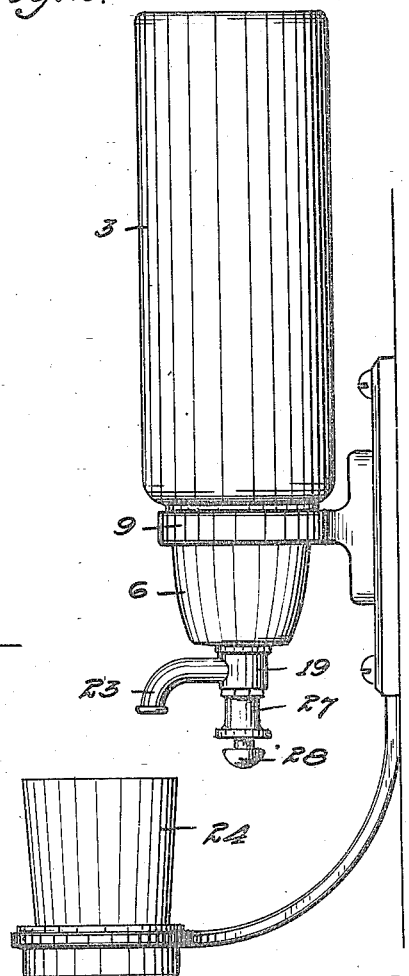

UNITED STATES PATENT OFFICE.

FREDERICK KEES, OF MINNEAPOLIS, MINNESOTA, ASSIGNOR OF ONE-HALF TO JOHN S. MITCHELL, OF MINNEAPOLIS, MINNESOTA.

DISPENSING DEVICE.

1,220,753. Specification of Letters Patent. Patented Mar. 27, 1917.

Application filed October 2, 1915. Serial No. 53,699.

*To all whom it may concern:*

Be it known that I, FREDERICK KEES, citizen of the United States, resident of Minneapolis, county of Hennepin, State of Minnesota, have invented certain new and useful Improvements in Dispensing Devices, of which the following is a specification.

A water bottle, particularly when filled, is heavy and inconvenient to handle and it is often difficult to pour out the contents without danger of spilling it or breaking the bottle.

The object of my invention, therefore, is to provide a stand or support wherein the bottle may be placed and its contents easily and quickly withdrawn.

A further object is to provide an attachment which can be applied to the bottle without change in the bottle itself and only a slight modification in its cover.

A further object is to provide a dispensing device particularly adapted for use with a thermos bottle.

Other objects of the invention will appear from the following detailed description.

The invention consists generally in various constructions and combinations, all as hereinafter described and particularly pointed out in the claims.

In the accompanying drawings forming part of this specification,

Figure 1 is an elevation of a thermos bottle with my attachment applied thereto, Fig. 2 is a similar view, showing a modified form of mounting, Fig. 3 is a vertical sectional view through the bottle and attachment, Fig. 4 is a perspective view of the cover of the bottle, Fig. 5 is a perspective sectional view, showing the disk device for closing the mouth of the bottle, Fig. 6 is a perspective view, showing the collar or ring in which the bottle is supported.

In the drawing, 2 represents the glass container of the thermos bottle and 3 the usual metallic jacket therefor, both being of ordinary construction. This jacket has a neck 4 with threads formed therein to engage similar threads 5 provided at the open end of the metallic cap 6 that is usually provided for closing the mouth of the bottle. I make no change in the bottle or jacket, but on the cap 6 I provide lugs 7 at intervals, brazed or secured thereon by any suitable means to engage flanges 8 which project inwardly from the upper edge of a ring 9 into which the open mouth of the thermos bottle is inserted. This ring has a shank 10 provided with a socket 11 to receive a standard 12, the shank resting on a shoulder at the upper end of the standard and being held in place by an ornamental knob 13 mounted on the top of the standard.

The jacket or bottle has a bearing in the ring 9 and the engagement of the lugs 7 with the flanges 8 prevents the bottle from tilting from an upright position and also prevents it from being withdrawn from the ring until it is rotated sufficiently for the lugs to clear said flanges.

The cover of the bottle, as usual, has flaring walls, and a disk 14 has a tapered outer surface 15 which fits snugly against the inner walls of the cover to form a close joint therewith, and said disk has a recess 16 in one side to receive a gasket 17 which, when the cover is fitted on the bottle, contacts with the neck and forms a close, air-tight joint therewith.

The disk 14 has a threaded socket 18 therein and a faucet 19 has an exteriorly threaded stem 20 to enter said socket and draw the disk firmly to its seat against the walls of the cover. This faucet stem is inserted through a hole 21 in the top of the cover and the passage 22 through the stem communicates with a spout 23 which projects laterally from the lower end of the stem in position to deliver the water or other liquid in the bottle into a glass 24, or other receptacle. A valve 25 is provided for closing the entrance to the passage 22 in the stem and a valve stem 26 is attached to said valve and extends down through a hollow plug 27 and is connected to a push button 28. A helical spring 29 is provided within the hollow plug on the stem 26 and its tension serves to hold the valve 25 upon its seat and close the outlet opening of the bottle. A vent 30 is also provided in the cover top and a tube 31, of non-conducting material, is mounted in the disk 14 and projects upwardly in the bottle to a point near the bottom thereof to destroy the vacuum in the bottle as the liquid is withdrawn.

The plug 27 is readily removable from the faucet to allow access to the parts for the purpose of cleansing or for repairs.

The bottle, when filled, is easily inverted and its cap inserted into the ring 9 and when rotated therein, will be securely locked until the lugs are disengaged from the flanges 8. When the bottle is empty, it may be easily and quickly separated from the ring and the cap removed to fill the container.

The device may be applied to various sizes of thermos bottles and the expense of making the attachment to any size thermos bottle will be found to be comparatively light, and when the bottle is mounted on the attachment, all inconvenience and annoyance resulting from lifting the heavy bottle to pour its contents will be entirely avoided.

This device is also applicable to an ordinary type of water bottle having a supporting collar for its inverted position and a cap in which the disk supporting the faucet may be placed. This, however, would be an obvious modification and I have not thought it necessary to illustrate the same herein.

I claim as my invention:

1. The combination, with a bottle having a cap, of a horizontally supported ring into which the cap and neck of the inverted bottle are inserted, said cap having means for interlocking with said ring to hold the bottle in an upright inverted position, and a faucet mounted in said cap and having means seated against the bottle neck for closing the same and provided with a draw-off passage and a discharge valve for said passage.

2. The combination, with a bottle having a cap, of a support into which the cap and neck of the inverted bottle are inserted, said cap and support having means for interlocking to hold the bottle in an upright, inverted position, and a faucet mounted in said cap and having means seated against the bottle neck for closing the same and provided with a discharge valve.

3. The combination, with a bottle and a cap fitting thereon, of a disk fitting within said cap and seated snugly against the walls thereof and having a gasket to fit against the neck of the bottle, a faucet mounted in said cap and tapped into said disk and having a draw-off opening and a valve therefor, and a ring having means for engagement with the walls of said cap for holding the bottle in an upright inverted position.

4. The combination, with a bottle, of a cap fitting the open end thereof, a faucet mounted in the top of said cap, a disk mounted on said faucet and having a tight joint with the wall of the bottle neck, a vent tube mounted in said disk and projecting into the bottle and communicating with an opening in the top of said cap, said faucet having a draw-off passage and a valve therefor, and means for supporting said bottle in an upright, inverted position.

5. The combination, with a bottle having a metallic jacket and a cap for encircling the neck and closing the same, of a ring mounted to receive said cap and the neck of the inverted bottle, said cap having means for interlocking with said ring for holding the bottle in an upright inverted position, and a faucet mounted in said cap and having a discharge passage and a draw-off valve, normally closed.

6. The combination, with a bottle, of a cap fitting the open end thereof, a faucet mounted in said cap and having means for forming a water-tight joint with the wall of the bottle neck around the discharge opening therein, a vent tube projecting into the bottle and communicating with an opening in the wall of said cap, said faucet having a draw-off passage and valve therefor and means for supporting the bottle in an upright inverted position.

In witness whereof I have hereunto set my hand this 30th day of September 1915.

FREDERICK KEES.